United States Patent
Laux et al.

(10) Patent No.: US 10,626,564 B2
(45) Date of Patent: *Apr. 21, 2020

(54) GROUND MILLING MACHINE, IN PARTICULAR ROAD MILLING MACHINE, FOR REMOVING GROUND MATERIAL, AS WELL AS METHOD FOR OPERATING A GROUND MILLING MACHINE

(71) Applicant: BOMAG GmbH, Boppard (DE)

(72) Inventors: Robert Laux, Neuwied (DE); Rafael Schomaker, Lingen (DE); Joachim Ponstein, Gondershausen (DE); Matthias Schaaf, Koblenz (DE); Bernd Lubischer, Boppard (DE)

(73) Assignee: BOMAG GmbH, Boppard (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/404,814

(22) Filed: May 7, 2019

(65) Prior Publication Data

US 2019/0257042 A1    Aug. 22, 2019

Related U.S. Application Data

(63) Continuation of application No. 15/473,664, filed on Mar. 30, 2017, now Pat. No. 10,301,782.

(30) Foreign Application Priority Data

Mar. 31, 2016    (DE) .................. 10 2016 003 895

(51) Int. Cl.
    *E01C 23/088*    (2006.01)
    *E01C 23/12*     (2006.01)
    *E21C 35/22*     (2006.01)

(52) U.S. Cl.
CPC .......... *E01C 23/088* (2013.01); *E01C 23/127* (2013.01); *E01C 2301/50* (2013.01); *E21C 35/223* (2013.01)

(58) Field of Classification Search
CPC .. E01C 2301/50; E01C 23/088; E01C 23/127; E21C 35/223; E21C 35/22
See application file for complete search history.

(56) References Cited

U.S. PATENT DOCUMENTS 6,106,592 A    8/2000   Paranjpe et al.
7,422,390 B2   9/2008   Gaertner et al.
(Continued)

FOREIGN PATENT DOCUMENTS

DE     20020845 U1    3/2001
DE     10223819 A1    12/2003
(Continued)

OTHER PUBLICATIONS

Espacenet, English Machine Translation of Abstract, Application No. DE102012022879B4, retrieved from https://worldwide.espacenet.com dated Oct. 1, 2015 (1 page).

(Continued)

*Primary Examiner* — David J Bagnell
*Assistant Examiner* — Michael A Goodwin
(74) *Attorney, Agent, or Firm* — Wood Herron & Evans LLP

(57) ABSTRACT

The present invention relates to a ground milling machine, in particular a road milling machine, for removing ground material, comprising a machine frame having a chassis, a milling drum supported on a machine frame, and a transport device having at least one conveyor belt, which is configured for conveying removed ground material in a conveying direction away from the milling drum to a discharge point, as well as to a method for operating a ground milling (Continued)

machine. One aspect of the present invention is to provide an electrostatic precipitator, which reduces the dust pollution.

19 Claims, 7 Drawing Sheets

(56) References Cited

U.S. PATENT DOCUMENTS

| | | |
|---|---|---|
| 2005/0179308 A1 | 8/2005 | Gaertner et al. |
| 2005/0179309 A1 | 8/2005 | Beming et al. |
| 2010/0327651 A1 | 12/2010 | Cipriani |
| 2014/0015303 A1 | 1/2014 | Denson et al. |
| 2015/0104255 A1 | 4/2015 | Musil |
| 2016/0326870 A1 | 11/2016 | Bjorge |

FOREIGN PATENT DOCUMENTS

| | | |
|---|---|---|
| DE | 102004007716 B3 | 6/2005 |
| DE | 102012022879 B4 | 10/2015 |
| DE | 102011052946 B4 | 1/2016 |
| GB | 2357049 A | 6/2001 |
| JP | 2007138419 A | 6/2007 |
| WO | 2013070078 A1 | 5/2013 |

OTHER PUBLICATIONS

Prof. Dr.-Ing. Matthias Stieb, Excerpt from German Textbook "Mechanische Verfahrenstechnik 2", Particle Separation from Gases, Chapter 7, Springer-Verlag Berlin Heidelberg GmbH, ISBN 978-3-540-55852-1, ISBN 978-3-662-08599-8 (eBook), DOI 10.1007/978-3-662-08599-8.

Luftpost, Except from German technical journal, Luftpost—Fachzeitschrift der ILT Industrie-Luftfiltertechnik, Fachinformationen zu Themen der Luftfiltration, Elekrofilter vs. mechanische Filter—welchen einsetzen?, No. 08-04-71, 2008 (4 pages).

GROUND MILLING MACHINE, IN PARTICULAR ROAD MILLING MACHINE, FOR REMOVING GROUND MATERIAL, AS WELL AS METHOD FOR OPERATING A GROUND MILLING MACHINE

CROSS-REFERENCE TO RELATED APPLICATIONS

The present application is a Continuation application of U.S. Ser. No. 15/473,664, filed Mar. 30, 2017, issued as U.S. Pat. No. 10,301,782 on May 28, 2019, which claims priority under 35 U.S.C. § 119 of German Patent Application No. 10 2016 003 895.0, filed Mar. 31, 2016, the disclosures of which are hereby incorporated herein by reference in their entireties.

FIELD OF THE INVENTION

The present invention relates to a ground milling machine, in particular a road milling machine, for removing ground material, as well as to a method for operating a ground milling machine.

BACKGROUND OF THE INVENTION

The present invention is generally concerned with dust control during operation of a ground milling machine, especially in the area surrounding the machine operator. For example, this is described in greater detail in DE 10 2012 022 879 B4, which is hereby incorporated herein by reference. The dust exposure created during working operation of such ground milling machines is disadvantageous for the operator as well as for people in the immediate vicinity of the construction machine for safety and health reasons. There is therefore a desire to reduce the dust emissions of a ground milling machine during operation as far as possible or at least to relieve particularly the machine operator from excessive dust exposure.

A particularly intensive development of dust occurs particularly in ground milling machines of the road milling type, in particular road cold milling machines, and so-called surface miners. Such ground milling machines comprise a machine frame with a chassis, a milling drum supported on the machine frame and arranged within a milling drum box, a transport device having at least one conveyor belt, which is arranged on the machine frame and configured for conveying removed ground material, i.e., the milled material, in a conveying direction away from the milling drum toward a discharge point.

Generic ground milling machines thus comprise at least one milling drum as a working device, which mills ground material with its rotational axis rotating horizontally and transversally to the working direction. The milled material is then carried-off from the milling drum box, in which the milling drum is arranged, to a transfer point via a transport device, typically comprising at least one conveyor belt, away from the milling drum in the conveying direction, at which transfer point the milled material is dropped or discharged, for example, into a transport means, in particular a truck, or onto the ground next to the construction machine. The conveying direction is thus the direction of transport of the milled material away from the milling drum.

A major source of dust generation is especially the region of the milling drum, respectively the milling drum box having the rotating milling drum arranged therein, and also the transport device. Typical ground milling machines are road milling machines, stabilizers, recyclers or surface miners.

Suction devices, which generate a negative pressure in the milling drum box and suction-off dust and steam generated there during the milling works, are already known from the prior art for ground milling machines. To that end, a suction device for sucking dust is provided, which is connected to a channel via a suction opening, the suction opening being arranged between the channel inlet and the channel outlet. The channel describes the conveying path of the milled material from its receiving position on the transport device to the discharge position, wherein the channel is typically formed to at least partially enclose or house the transport device in this area. Preferably, the suction opening is mounted in the vicinity of the channel inlet. Such a construction machine is described, for example, in DE 102 23 819 A1, which is hereby incorporated herein by reference with respect to the structure and functions of a generic construction machine. To prevent suctioning of air via the channel outlet toward the suction opening, the installation of rubber mats at the channel outlet is described there, which at least partially seal the channel outlet in the conveying direction toward the outside. However, it has shown that these rubber mats are extremely susceptible to wear, especially also due to the sharp-edged nature of the milled material. An alternative option, which practically does not involve wear, is described in DE 10 2012 022 879 B4, according to which a blocking flow is generated by means of a fluid flowing device, in order to allow a defined flow guidance of the dust-laden air.

However, the known options for reducing dust emission of a ground milling machine are still unsatisfactory. Therefore, the object of the present invention is to provide a possibility of further reducing dust emissions in a generic ground milling machine.

SUMMARY OF THE INVENTION

One aspect of the present invention is to provide the ground milling machine with an electrostatic precipitator, by means of which dust, which is generated during the milling operation and/or during the transport of milled material, can be removed from the dust-laden air. As used herein, an electrostatic precipitator or electrostatic filter describes a device that enables a precipitation of particles contained in the air, in particular suspended dust particles, using the electrostatic principle. These particles particularly include dust particles having an aerodynamic diameter of not more than 50 µm, and, in particular, of not more than 30 µm, for example. Charging of the dust particles and subsequent precipitation is achieved according to way and manners known from the prior art. The advantage of the use of an electrostatic precipitator in the present case lies with the fact that significantly improved filter results can be achieved, in particular with respect to the particulate matter content, and the particulate matter loading for the operator of the ground milling machine and people in the vicinity can be reduced in this way. In addition, it has shown that the electrostatic precipitator can be integrated in a ground milling machine in a particular favorable manner and also be operated there in a reliable manner. At the same time, precipitation results are very good, so that a particularly efficient reduction of dust is possible using the arrangement according to the present invention. An electrostatic precipitator is described per se in WO2013/070078 A1, which is hereby incorporated herein by reference.

It is preferred that the electrostatic precipitator is arranged in the place or at least close to the place where the dust is generated or where the dust pollution is relatively high compared to the surroundings, respectively. Basically, it is possible to arrange the electrostatic precipitator close to the milling drum box, for example, in the outlet region of the milled material from the milling drum box. This arrangement provides the advantage that the electrostatic precipitator is directly integrated in the machine body and thus allows a particularly compact construction of the whole machine. As an alternative, it is preferred for the electrostatic precipitator to be arranged at the transport device, in particular a suspension conveyor belt. The transport device follows the milling drum and the milling drum box, respectively, with respect to the flow of material of the produced milled material, so that the dust pollution is typically also relatively high in this area. Furthermore, the transport device and particularly the suspension conveyor belt is particularly suitable for the arrangement of the electrostatic precipitator also for space-related reasons, especially also because the electrostatic precipitator is accessible from the outside at this point (suspension conveyor belt) for maintenance and/or cleaning purposes. Furthermore, this area is particularly suitable for mounting a retrofit electrostatic precipitator.

Specifically, the transport device may include a transfer conveyor belt and, downstream in the conveying direction, a loading conveyor belt. The transfer conveyor belt is often arranged inside the ground milling machine or in the interior of the machine body, whereas the loading conveyor belt typically is a so-called suspension conveyor belt, which is suspended from the machine frame of the ground milling machine. Primarily, the transfer conveyor belt is used to supply milled material away from the milling drum and the milling drum box, respectively, to the loading conveyor belt, which is arranged downstream in the conveying direction. The actual loading of the milled material is effected with the loading conveyor belt, for example, to a corresponding transport vehicle. Furthermore, it is advantageous for transport purposes when the ground milling machine is as small as possible in terms of its longitudinal extension. To that end, it is known from the prior art to configure the loading conveyor belt in a foldable manner with a machine part and a folding part, wherein the folding part is foldable to the machine part, in particular preferably from below. In other words, the loading conveyor belt is connected to the remaining ground milling machine via the machine part, and the foldable part forms the discharge area of the loading conveyor belt, which can be folded for transport purposes. It is now preferred for the electrostatic precipitator to be arranged at the loading conveyor belt, and, in particular, if a foldable loading conveyor belt is used, to be arranged at the machine part of the loading conveyor belt. On the one hand, this place is particularly suitable for arranging this additional module for space-related reasons. On the other hand, it turned out that the arrangement at the point is particularly suitable for guiding the dust-laden air and allows a sufficient reduction of the dust pollution, in particular in the area of an operator platform of the ground milling machine as well as in the discharge area of the loading conveyor belt. Furthermore, in terms of weight and weight distribution, it is ideal when the loading conveyor belt is formed in such a way that the foldable part can be folded from below to the machine part and accordingly the electrostatic precipitator is mounted on top of the machine part.

In order to achieve a compact machine, it is further also possible for the electrostatic precipitator to be arranged inside the machine body. In the present case, the machine body particularly relates to the body shell of the machine, which is typically formed by hoods, sheets, etc. Thus, in this embodiment, the electrostatic precipitator is not placed externally to the machine, but positioned in the interior of the machine. In this way, the external dimensions of the machine are not additionally enlarged by the electrostatic precipitator provided according to the present invention. In this regard, it is preferred that the ground milling machine comprises at least one transfer conveyor belt, onto which milled material conveyed out of the milling drum box is directly transferred and via which the milled material is transported out of the interior of the machine, a duct being present for receiving the transfer conveyor belt, and wherein the electrostatic precipitator is at least partially arranged inside this duct. Thus, the duct describes a tunnel-like, longitudinal recess provided in the interior of the machine, in which, for example, the transfer conveyor belt can be inserted from the outside. Thus, this duct is particularly suitable for accommodating the electrostatic precipitator, since the construction space, which is already present in conventional machines, is large enough for additionally accommodating the electrostatic precipitator or has to be enlarged to an insignificant extent only.

In order to enable a defined guidance of dust-laden air generated in the milling process, preferably a pump device, in particular a suction device, is provided, by means of which the dust-laden air is conveyable. Such pump devices, for example, corresponding fans, are basically known from the prior art, as disclosed in DE 10223819 A1 and DE 102012022879 B4, for example. According to the present invention, it is now provided that the pump device, in particular in the form of a suction device, is configured such that it feeds dust-laden air to the electrostatic precipitator. As a result, it is particularly possible to achieve a targeted dust-suctioning out of dust-laden areas and guidance of the dust-laden air toward the electrostatic precipitator, in order to enable a particularly efficient precipitation of dust particles from the air.

Various alternatives may be considered for the specific configuration of the flow guidance of the dust-laden air. For example, it is advantageous when the pumping device comprises a suction device, by means of which dust-laden air is suctioned from the milled material and the immediate vicinity, the suction device being particularly configured in such a way that the suction direction runs at least partially against the conveying direction of the milled material on the side of the inlet toward the suction device. In this embodiment according to the present invention, the dust-laden air is deflected once, in particular by more than 90°, in relation to the conveying direction of the milled material. This provides the advantage that larger components, such as small milled material parts, etc., carried along in the flow of air generated by the conveyance of the milled material are separated from the suctioned dust-laden flow of air due to inertia of these parts, whereby the electrostatic precipitator is also spared after all.

In addition, or alternatively, it is preferred when a flow duct is present, through which the dust-laden air is guided using the pump device. Thus, a flow duct describes a channel-type, in particular static, flow guidance section, in particular having one or multiple duct walls, including an air inlet, a dust removal path, and an air outlet. Preferably, the electrostatic precipitator is arranged at least partially, particularly with at least one charging stage and at least one precipitation stage, inside this flow duct. The charging stage of the electrostatic precipitator describes the region which is responsible for the electrostatic charging of the dust particles. In contrast, the precipitation stage describes the portion of the electrostatic precipitator by which the electrostatically charged particles are attracted and where they are precipitated. The flow duct per se may vary in various advantageous manners.

Basically, it is possible to configure the flow duct, for example, as a housing of at least a part of the transport device. In this way, a particularly compact overall configuration of the transport device and electrostatic precipitator can be obtained. The conveyance channel of the transport device and the flow duct of the electrostatic precipitator then form a common space, wherein additionally particularly preferably a mechanical barrier is provided between the sub-space of the electrostatic precipitator and the sub-space of the conveyance channel, for example, a grate, in order to avoid damage to parts of the electrostatic precipitator by components or parts of the milled materials. However, it is also possible that the flow duct is formed at least partially spatially separate from a conveyance channel surrounding the conveyor belt. In this way, transport of the milled material and precipitation of dust particles from the dust-laden air are effected in different compartments. As a result, the precipitation rate of the electrostatic precipitator can be improved on the one hand, and damage of the electrostatic precipitator caused by the milled material can be reliably prevented in the other hand. In this regard, it is ideal when the electrostatic precipitator is arranged and configured to be completely separated from the conveyance channel.

The flow duct of the electrostatic precipitator is preferably formed in such a way that it ends into the conveyance channel at the outlet side, in particular above the conveyor belt. Thus, the dust-laden air is first suctioned, for example, in the region of the milling drum box and/or the transfer conveyor belt, branched off and fed to the electrostatic precipitator. After having passed through the electrostatic precipitator, the now cleaned air is supplied to the conveyance channel, in particular above the conveyor belt. In this way, a separate air outlet for the cleaned air is not required at the ground milling machine, and it can in particular, be blown out together with the milled material on the outlet side of the conveyance channel. To that end, at least one connection line may be provided beyond the flow duct, which follows this duct in the passage direction, for example. The dust-removed air which exits the flow duct can be routed via this, in particular flexible, connection line to the conveyance channel and/or to the outer surroundings, for example.

It is ideal for the flow duct of the electrostatic precipitator to be arranged on the conveyance channel of the transport device, or is placed thereon. The flow duct of the electrostatic precipitator forms a compact unit together with the conveyance channel of the transport device. In particular, this can be the loading conveyor belt, or also the interior portion of a duct, as described above, in particular for a transfer conveyor belt.

The electrostatic precipitator may also be formed in such a way that the air to be cleaned is essentially routed in a straight manner through the same. However, it may also be advantageous when the air guidance in the electrostatic precipitator is effected such that the air is deflected inside the electrostatic precipitator for one or multiple times, for example, by means of suitable guidance surfaces, etc., wherein guidance surfaces which are not directly flown by the air can also, in particular, be used as separation means of the electrostatic precipitator.

Preferably, the electrostatic precipitator is configured in such a way that the charging stage is an anode, in particular in the form of a corona electrode, and the precipitation stage is a cathode. The electrostatic charge of the dust particles is thus preferably such that these particles become positively charged. This type of charge has proved to be particularly efficient for the present application. Accordingly, the precipitation stage is preferably negatively charged. In this way, a particularly efficient agglomeration of the dust particles and subsequent precipitation is effected on the precipitation stage. However, it is also possible and explicitly comprised by the present invention that the charging stage is the cathode and the precipitation stage is the anode. This may also lead to satisfying precipitation results.

Basically, it is possible to adjust the precipitation stage to the respective structural conditions as required. Here, it is preferred when the precipitation stage is as large as possible, in order to allow an efficient precipitation of the charged dust particles. It is ideal for the precipitation stage to extend longitudinally in the passage direction of the air routed through the electrostatic precipitator, in order to obtain a maximum precipitation path. For example, the precipitation stage can be a plate and/or a grate. It is optimal for the precipitation stage to be a housing, at least inner housing, of the electrostatic precipitator, which, in particular, is formed as a flow duct. In this embodiment, the precipitation stage has a double function. Besides a relatively large precipitation surface, it simultaneously forms at least a part of the housing of the electrostatic precipitator. The precipitation stage may particularly also include multiple individual precipitation surfaces and/or be configured to be three-dimensionally deformed, in particular curved.

Also, with regard to the specific design of the charging stage, a plurality of variants can be considered. For example, the charging stage may be a wire, a wire mesh or a plate-like structure. The essential factor is that certain minimum distances to the precipitation stage are observed, in order to prevent breakover between charging stage and precipitation stage as far as possible. Furthermore, it is preferred when the charging stage extends in the longitudinal direction of the precipitation stage, in particular along the flow duct and/or in the direction of the air flow direction. In this way, it is possible to maximize the path that the dust-laden air needs to pass, and to thereby achieve optimum precipitation rates. Accordingly, the charging stage preferably extends in the flow direction of the dust-laden air. In addition, or as an alternative, the charging stage may be designed in such a way that it includes at least a sub-portion which extends essentially transversely to the flow direction of the dust-laden air. In this case, the charging stage is a kind of flow obstacle and/or vortex stage, by means of which a high ionization rate of the dust particles in the dust-laden air can be ensured just as well. Even additional vortex devices such as vortex plates can be provided for improving the charging process.

Thus, during operation of the ground milling machine, and, in particular, of the electrostatic precipitator, a precipitation of dust particles is effected in the electrostatic precipitator, in particular at the charging stage. In order to have the efficiency of the electrostatic precipitator as optimal as possible, it is important to clean the electrostatic precipitator at regular intervals, since dust particles precipitated at the precipitation stage have an isolating effect, for example. To that end, it is basically possible to perform this manually, for example, by interrupting the working process. However, it is preferred that the electrostatic precipitator includes a cleaning device, by means of which material adhering to the electrostatic precipitator can be removed therefrom. The advantage of the cleaning device is that the cleaning of the electrostatic precipitator can, for example, automatically be effected and/or without elaborate manual work. To that end, the cleaning device may comprise a switch-off device, via which voltages applied to the precipitation stage and the charging stage can be switched-off during operation of the conveyor device. The electrostatic precipitator is blown free by means of the pump device then. This effected can be further promoted if a pressure impulse can be generated by means of the pump device. In addition or as an alternative, an interval-based or short-term pole reversal of the precipitation stage and the charging stage can be effected in order to loosen adhering material and remove it. The electrostatic precipitator may also comprise a separate cleaning device having cleaning nozzles, for example, in particular for air and/or water, the actuation of which triggers the charging stage and/or the precipitation stage to be applied with pressurized air and/or water. Water provides the advantage of binding the precipitated dust particles. Another possibility is a mechanical cleaning device, by means of which dust particles precipitated at the precipitation stage can be removed. This may be a shaking or shock device, in particular with a motor-driven tappet and/or eccentric, so that the precipitated dust is shaken off the precipitation stage. A strapping and/or brushing device is possible as well.

Basically, it is, for example, possible to blow out the dust material removed by the cleaning device from the electrostatic precipitator. However, it is more elegant for the cleaning device to have a discharge opening or a discharge flap, through which material cleaned off by the precipitator stage can be removed from the electrostatic precipitator, in particular onto the conveyor belt or into a separate container. Thus, a connection between the electrostatic precipitator and the conveyor belt or the container is obtained by means of the discharge opening or discharge flap, via which the precipitated dust can be fed to the conveyor belt or be discharged separately via the container. The discharge opening or flap is preferably configured in such a way that material loosened from the precipitation stage falls onto the conveyor belt or into the container through this opening or flap. This ensures that the cleaned-off dust material can either be loaded together with the remaining milled material or be fed to a separate discharge process. In the case that a container is used, a separate container compartment may be provided at the machine per se, in order to be able to carry the container, or to use an ideally sealed connection device, via which an external container can be connected to the discharge opening or the discharge flap for cleaning purposes in a dust-proof manner.

Furthermore, a housing having at least one maintenance flap is part of the electrostatic precipitator, which flap allows access to the internal space of the electrostatic precipitator, in particular the charging stage and/or the precipitation stage. Thus, the maintenance flap is closed in normal operation of the electrostatic precipitator. Thus, the maintenance flap allows access from outside to the internal space of the electrostatic precipitator, for example, for cleaning and/or maintenance purposes.

The electrostatic precipitator may completely and permanently be mounted in the ground milling machine. However, as an alternative, the electrostatic precipitator may also be configured as a module comprising at least one connection device for connecting an electric, in particular machine-sided, energy supply. This variant provides the advantage that the electrostatic precipitator can be dismounted and/or exchanged relatively quickly, which may be desired, for example, when defects occur to the electrostatic precipitator. As used herein, the term module relates to a unit which can be mounted to and dismounted from the remaining machine as one component. In this regard, it is ideal for the electrostatic precipitator to comprise a releasable holding device for being fastened to the ground milling machine, in particular comprising at least one of the features rail guidance and/or form-fit and/or clamping fixation device. On the one hand, the releasable holding device allows for particularly easy dismounting of the electrostatic precipitator, since the fixation of the electrostatic precipitator can be released in a particularly quick manner. On the other hand, the electrostatic precipitator reliably reaches its predefined final position by means of the holding device, which in turn speeds up and simplifies the installation of the electrostatic precipitator.

It is preferred if a closing state sensor is provided, via which the closing state of the maintenance flap can be monitored. Such a closing state sensor can be a contact switch, in particular a reed contact switch or the like, which is actuated when the maintenance flap is closed. Preferably, the closing state sensor is in contact with a control unit. The control unit is configured in such a way that it prevents the precipitation stage and/or the charging stage to be supplied with electric energy when the maintenance flap is open. As a result, safety for operators can be improved.

Basically, it is possible to use a distinct energy source such as a battery for supplying electric energy to the electrostatic precipitator. However, it is preferred when the electrostatic precipitator is connected to the power grid of the ground milling machine for electric energy supply. Ideally, a converter is provided in between.

Furthermore, the present invention includes embodiments, in which at least two electrostatic precipitators are connected in parallel, or in which at least two flow ducts are provided. In this way, precipitation results can be improved further. Additionally, or as an alternative, two electrostatic precipitators can be connected in series.

Further cleaning stages may be provided in addition to the electrostatic precipitator. Thus, it is possible to provide, in particular upstream the electrostatic precipitator in the flow direction of the dust-laden air, a centrifugal separator (cyclone filter), by means of which coarse particles can be removed from the dust-laden air upstream the electrostatic precipitator. Just as well, a grate and/or at least one labyrinth filter stage can be provided. If an upstream filter stage is used, this filter stage is ideally configured in such a way that it effects just a small pressure drop via this filter stage. In addition, or as an alternative, a post-filter stage for precipitation of particulate matter may be provided, which is connected downstream the electrostatic precipitator in the passage direction, the post-filter stage particularly being another electric filter. Thus, using this variant, particularly good precipitation results can be achieved. These increased efforts make sense especially if problematic materials, such as asbestos, are involved, and/or if works are done inside of buildings. In addition, or as an alternative, it is also possible to provide a water sprinkling device in addition to the electrostatic precipitator. This water sprinkling device is arranged in the region downstream the electrostatic precipitator, in particular with respect to the air moved by means of the pump device, very particularly in the region of the loading conveyor belt. A kind of water barrier or curtain or spray water wall can be established by means of the water sprinkling device, which has to be passed by the air routed through the electrostatic precipitator before exiting, in particular, the conveyance channel. Specifically, the water sprinkling device may be one or multiple nozzles and/or a spray bar. The water sprinkling device allows to efficiently collect dust particles, which are still contained in the air after passing through the electrostatic precipitator. It is optimal if measures are taken so as to charge the water discharged by the water sprinkling device just like the precipitation stage, which may be effected by a corresponding ground connection, for example. In this way, the cleaning effected achieved by the sprinkling device can be further improved. Furthermore, the sprinkling device is optimally arranged in such a way that water discharged by it is collected by the conveyor belt, in particular the loading conveyor belt. During operation, the water delivered is discharged together with the milled material.

Another aspect of the present invention is a method for operating a ground milling machine, in particular for the reduction of the dust pollution in operation of the ground milling machine. The method particularly relates to the operation of a ground milling machine according to the present invention. The essential steps of the method according to the present invention are A) performing a milling process, B) routing of-dust-laden air to an electrostatic precipitator, C) charging and precipitating (44) of dust particles in the electrostatic precipitator, and D) blowing out the cleaned air. Thus, an essential factor for of the method according to the present invention for operating the ground milling machine is that an electrostatic precipitator is used for reducing the dust pollution, with the dust-laden air being fed to this precipitator for cleaning. Only the cleaned air is blown out after passing the electrostatic precipitator, so that the operator of the ground milling machine as well as people in the surroundings are exposed to a lower dust pollution. In step B), the dust-laden air is, in particular, sucked out of the region of the milling drum box, in particular via a suitable suction device. The dust-laden air is subsequently routed out of the inner space of the ground milling machine and routed further to the electrostatic precipitator. In step C), particularly positive charging of the dust particles is provided. In step D), the blow-out is preferably effected by routing the air back into the conveyance channel of the transport device, i.e., the blow-out is not performed at a separate location on the ground milling machine, which however is also possible and also comprised by the present invention.

Furthermore, the method according to the present invention can be further improved if in step B) the dust-laden air is sucked out of the milling drum box and/or a conveyance channel for milled material, and/or when in step C) charging and precipitation is effected in a flow duct separate from the conveyance channel. First, the essential factor in these preferred embodiments lies with the targeted suctioning of the dust-laden air out of the milling drum box and/or a conveyance channel for milled material. The sucked, dust-laden air will subsequently be fed to the electrostatic precipitator in a physically separated portion for precipitation. In this way, a distinct dust removal path is achieved, which is physically separated from the transport path of the milled material (conveyance channel). On the one hand, this allows a particularly efficient precipitation of the dust contained in the dust-laden air. On the other hand, it can be excluded that parts of the electrostatic precipitator are damaged by milled material.

It is optimal if a passage through a water curtain or a water sprinkling device follows the charging and precipitation of dust particles in the electrostatic precipitator downstream in the air flow direction. In this way, two cleaning stages are connected in series, whereby a particularly efficient removal of dust particles from the dust-laden air is effected.

It may also be provided that a precipitation or collection of particles which are large compared to floating dust particles is effected upstream the charging and precipitation of dust particles in the electrostatic precipitator in the air flow direction, for example, to avoid damages to the electrostatic precipitator. Reference is made to the above description with respect to the specific design and configuration of the pre-filter stage.

BRIEF DESCRIPTION OF THE DRAWINGS

The present invention will be described in greater detail below by means of the exemplary embodiments indicated in the Figures. In the schematic figures.

Like or equivalent components are designated by like reference numerals throughout the figures, in which not each component recurring in multiple figures is necessarily designated in each of the drawings.

DETAILED DESCRIPTION OF THE INVENTION

Figure 1:
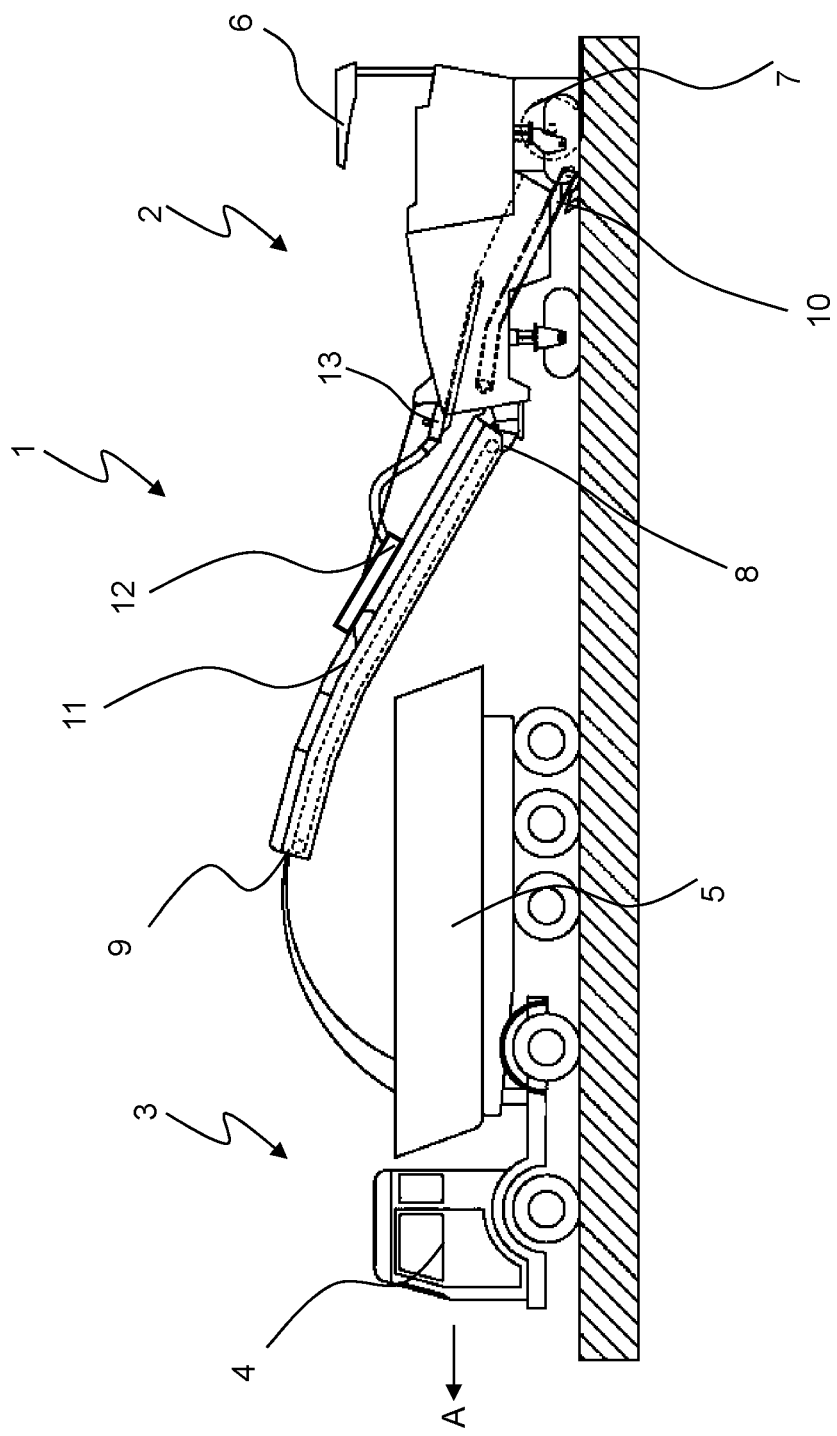
FIG. 1 is a side view of a work train including a ground milling machine and a transport vehicle.

The work train 1 in FIG. 1 comprises a ground milling machine 2, specifically a cold milling machine of the rear rotor type, and a transport vehicle 3. During milling operation, the ground milling machine 2 drives in a self-propelled manner behind the transport vehicle 3 in the working direction A. Elements of the transport vehicle 3 include an operator platform 4 as well as a loading space 5 for receiving milled material. Besides an operator platform 6, the ground milling machine 2 comprises a machine frame 46 (FIG. 2), travel units (crawler tracks or wheels), a drive engine, a milling device 7 and a transport device 8, by means of which the obtained milled material can be transported from the milling device 7 all the way to the discharge point 9 of the transport device 8. To that end, the transport device 8 comprises a transfer conveyor belt 10, which is arranged inside the ground milling machine 2, as well as a loading conveyor belt 11. Furthermore, the ground milling machine 2 comprises an electrostatic precipitator 12, which is arranged on the loading conveyor belt 11 of the transport device 8. The electrostatic precipitator 12 allows precipitating dust that is generated in the milling process and transport of the milled material. To that end, the electrostatic precipitator 12 is connected to a pump device 13, specifically a fan.

Figure 2:
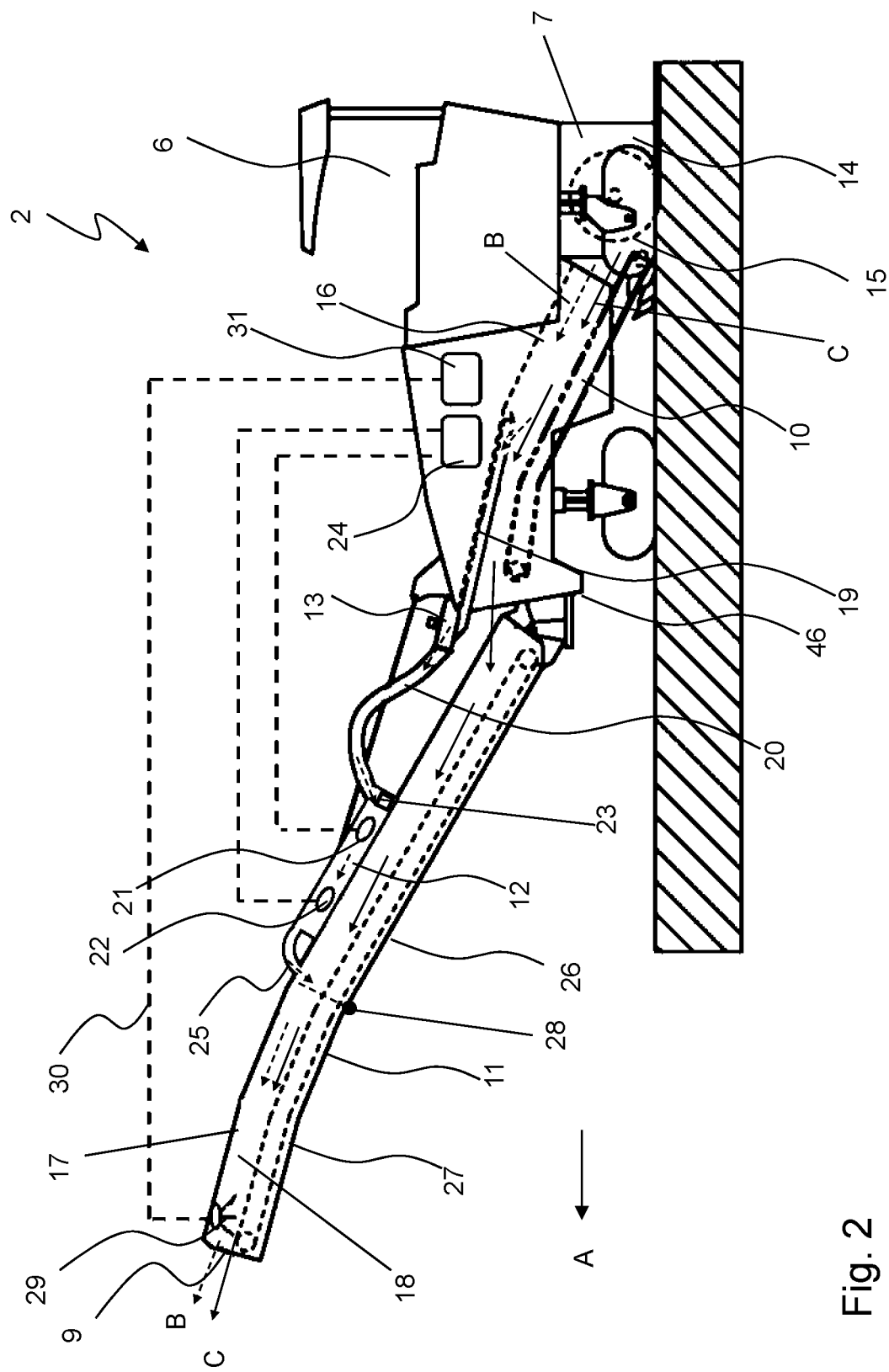
FIG. 2 is an enlarged view of the ground milling machine of FIG. 1.

FIG. 2 illustrates further details on the structure of the ground milling machine 2 of FIG. 1. The milling device 7 specifically comprises a milling drum box 14 as well as a milling drum 15. The milling drum is movable about an axis of rotation running horizontally and transversely to the working direction A in a manner known per se inside the milling drum box 14. The ground material milled off by the milling drum 15 is loaded out of the milling drum box 14 onto the transfer conveyor belt 10 and transported inside a conveyance channel 16 inside the ground milling machine 2 to the loading conveyor belt 11. The loading conveyor belt is also surrounded by a housing 17, so that the loading conveyor belt 11 also extends inside a conveyance channel 18. The loading conveyor belt 11 or the conveyance channel 18 ends into the discharge place 9, from which milled material is discharged to a transport vehicle, for example.

A component of the ground milling machine 2 is a device for suctioning and precipitation of dust, as will described hereinafter in greater detail. Besides the above described elements electrostatic precipitator 12 and pump device 13 in the form of a suction fan, the device for precipitation of dust further comprises a suction channel 19, a connection line 20, a charging stage 21, a precipitation stage 22, a cleaning device 23, a supply source 24 for electric energy as well as an outlet 25 of the electrostatic precipitator 12. Dust-laden air is suctioned via the suction channel from the region of the milling drum box 14 as well as, in particular, from the region of the conveyance channel 16. A negative pressure in this region is generated by the suction fan 13 so that the dust-laden air is suctioned. The suction device 13 is connected to the electrostatic precipitator 12 via the connection line 20. Thus, if the dust-laden air arrives in the electrostatic precipitator 12 via the connection line 20, first the dust particles are charged by the charging stage 21, whereupon the charged dust particles are precipitated at the precipitation stage 22. To that end, the charging stage 21 and the precipitation stage 22 are connected via suitable connection lines to the electric energy source 24, which in the present exemplary embodiment is a high voltage power source HVPS, which is connected to the power grid of the ground milling machine 2 via a converter. The now cleaned air is blown out by the electrostatic precipitator 12 via the outlet 25 into the conveyance channel 18 and thus exits the transport device 8 also via the discharge point 9.

The electrostatic precipitator 12 is arranged on the loading conveyor belt 11 here. Specifically, the loading conveyor belt 11 is a foldable conveyor belt having a machine part 26 and a foldable part 27, which are pivotally connected to one another via a pivot joint 28. In other words, the electrostatic precipitator is disposed on the "non-foldable" portion of the loading conveyor belt 11.

FIG. 2 shows the flow guidance of the air, using dashed arrows B, and the conveyance direction of the milled material, using arrows C. FIG. 2 indicates that the dust-laden air is first separated from the milled material through the suction channel 19, which is why the dust removal process is effected at a physically separated place with respect to the conveyance of milled material. As a result, the electrostatic precipitator 12 can be protected from damages caused by the milled material, for example. Furthermore, it is also possible to configure the electrostatic precipitator 12 in such a way that the entering air flow is decelerated inside the electrostatic precipitator in order to improve the precipitation result, for example, by enlarging the flow cross-section.

The cleaning device 23 allows cleaning dust precipitated within the electrostatic precipitator 12 off the precipitation stage 22. For example, the cleaning device 23 can be actuatable from outside the electrostatic precipitator 12, be actuated automatically after certain operating intervals and/or be actuated automatically in certain operating situations, for example, when starting the loading conveyor belt 11. Furthermore, a suitable control unit (not shown in FIG. 2) may be provided, via which the operation of the cleaning device 23 can be controlled, in particular automatically. In order to enable an easier carry-off of the cleaned-off dust material, a connection opening between the ground of the electrostatic precipitator 12 and the conveyance channel 18 may be additionally provided, through which cleaned-off dust may fall from the electrostatic precipitator 12 onto the conveyor belt of the loading conveyor belt 11.

Furthermore, FIG. 2 shows that a further device for dust removal is provided in addition to the electrostatic precipitator 12. Specifically, this is a sprinkling device 29 (which may optionally also be provided in further exemplary embodiments, particularly according to FIGS. 5 to 7), which extends over the width of the conveyor belt or the loading conveyor belt 11 shortly ahead of the discharge place 9. For example, the sprinkling device may be a spray bar having multiple outlets or nozzles, by means of which a kind of water curtain can be created. The supply of the sprinkling device 29 is effected via a supply line 30 from a water tank 31 at the ground milling machine 2. In the present exemplary embodiment, the water discharged from the sprinkling device 29 falls onto the milled material transported on the loading conveyor belt. Dust particles which may have been collected via the sprinkling device 29 are thus unloaded together with the milled material via the discharge point 9. The cleaning of the dust-laden air of the ground milling machine 2 is thus effected in two stages in the present exemplary embodiment, with the electrostatic precipitator 12 being disposed upstream the sprinkling device 29 in the flow direction of the dust-laden air.

Figure 3:
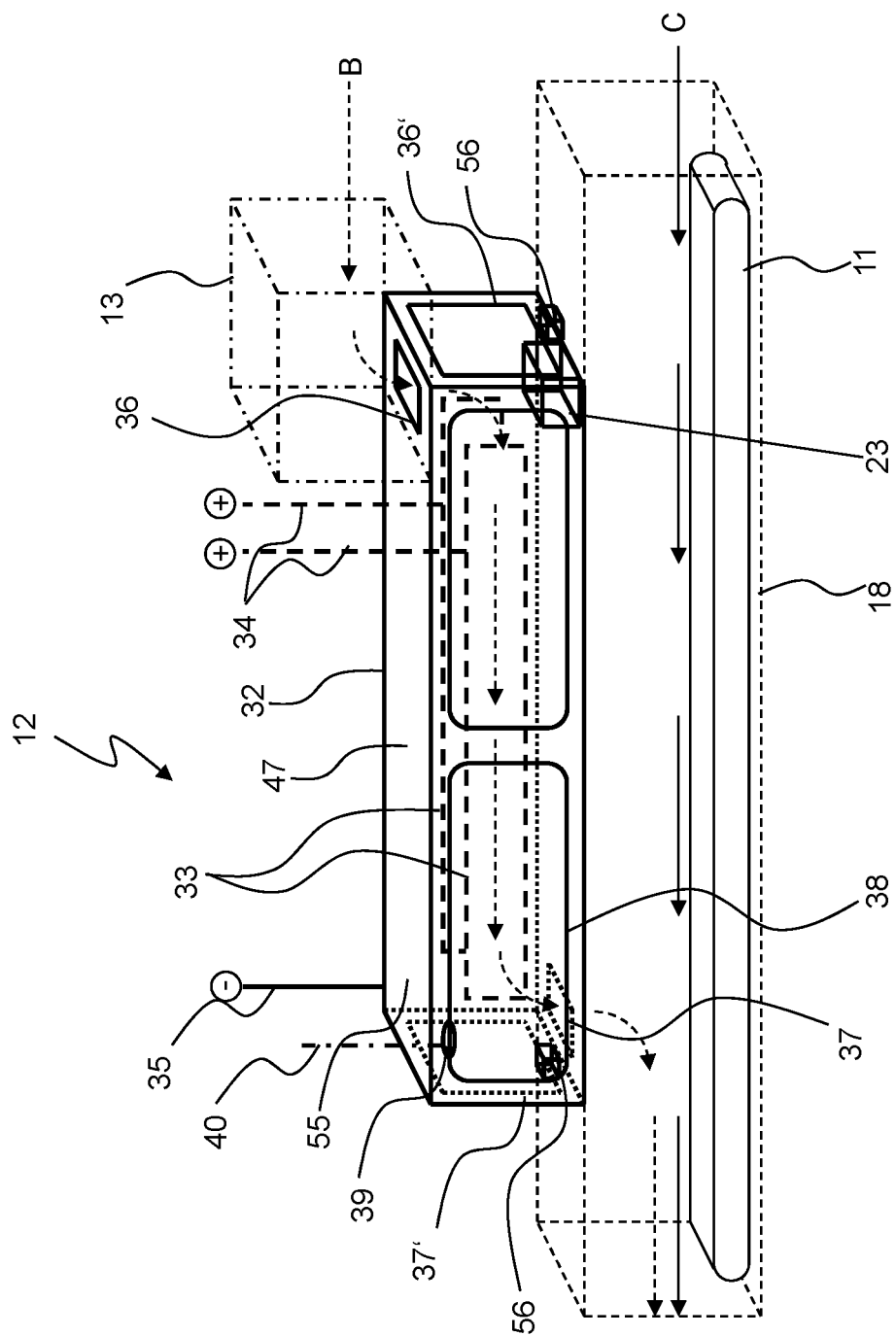
FIG. 3 is a schematic view of a portion of the transport device as well as of the electrostatic precipitator of FIGS. 1 and 2.

Finally, FIG. 3 illustrates the structure and arrangement of the electrostatic precipitator 12 in a schematic illustration. The electrostatic precipitator 12 per se is illustrated with solid lines. Essential elements of the electrostatic precipitator 12 are a box-like housing 32 as well as charging plates 33 located inside the housing 32, which form the charging stage 21. The housing 32 is oriented with a longitudinal extension parallel to the longitudinal extension of the loading conveyor belt 11, which is shown with a dashed line, and thus forms a flow duct 47 for dust-laden air to be cleaned, which runs parallel to the conveyance channel 18. The charging plates 33 extend in the longitudinal extension of the housing 32 and the flow duct 47, respectively. The charging plates are connected as an anode 34, and the housing 32 is accordingly connected as a cathode 35. Thus, the charging plates form the charging stage 21, and the housing 32 of the electrostatic precipitator forms the precipitation stage 22 of the electrostatic precipitator 12.

The supply of the dust-laden air, which is suctioned via the pump device 13 (dashed line arrows B) is effected from the upper side of the housing 32 via a corresponding supply opening 36. As an alternative, supply is also possible from the side via an optional opening 36'. The electrostatic charging of the dust particles inside the electrostatic precipitator 12 is thus effected via the charging plates 33, which also extend in the longitudinal direction of the housing 32 at a sufficiently large distance to the housing 32. The electrostatically charged dust particles are thus attracted by the housing 32 according to the charge conditions and are thus precipitated thereon inside the electrostatic precipitator 12. The cleaned air is blown out of the electrostatic precipitator 12 via the outlet opening 37 into the conveyance channel 18 above the loading conveyor belt 11. Alternatively, the cleaned air can be blown out to the outer surroundings via other passages, for example, an outlet 37'.

Furthermore, maintenance flaps 38 are mounted on the longitudinal sides in the housing 32 of the precipitator 12. The maintenance flaps 38 can be opened so that external access into the internal space of the electrostatic precipitator 12 is possible. For example, this can be desired for maintenance purposes and/or cleaning purposes. In order to prevent access from outside into the internal space of the electrostatic precipitator 12 during operation of the electrostatic precipitator 12, a closing state sensor 39 is provided, which is connected to a corresponding control unit via a connection line 40. The control unit (not shown in the Figures) is configured such that it interrupts the operation of the electrostatic precipitator 12 or the electric energy supply thereof in a forced manner when the closing state sensor 39 indicates that the maintenance flaps 38 are open. In other words, in the present exemplary embodiment, operation of the electrostatic precipitator 12 is possible only if the maintenance flaps 38 are closed.

FIG. 3 illustrates the schematic structure of a single electrostatic precipitator 12. The present invention explicitly also comprises variants in which two or more of these electrostatic precipitators 12 are arranged to be particularly connected in parallel, so that the suctioned dust-laden air is supplied to the individual electrostatic precipitators 12 in a separated manner. This also includes embodiments, in which the multiple electrostatic precipitators 12 are enclosed or surrounded by a common housing.

Furthermore, in FIG. 3, the electrostatic precipitator 12 is configured as one unit or module 55. The module 55 comprises the housing 32, the charging stage 21, the precipitation stage 22 as well as ports for connection lines to the anode 34 and cathode 35 for connection to the machine 1. The electrostatic precipitator 12 is mounted or fixed via detachable or releasable holding devices 56 on both sides, or on two opposite sides, on the housing surrounding the conveyance channel 18 (arrangement inside the machine itself, as will be described later, in particular also on or in the conveyance channel 16, is possible). Specifically, the holding devices 56 may be threaded connections, rail supports, form-fit supports, latch supports, etc., or a combination thereof. As a result, the electrostatic precipitator 12 can also easily be demounted or, vice versa, be retrofitted to existing machines. However, it is also possible to install the electrostatic precipitator 12 for a permanent installation in the machine.

Figure 4:
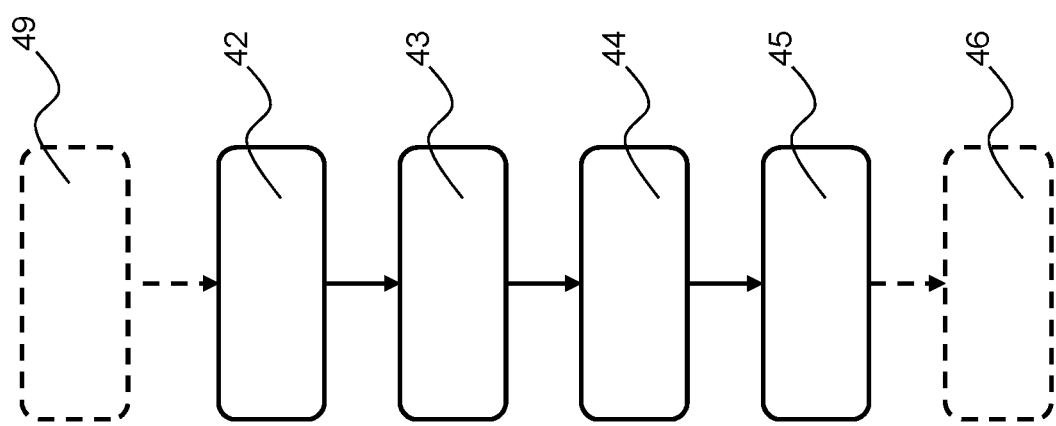
FIG. 4 is a flow chart of a method according to the present invention.

FIG. 4 illustrates a method according to the present invention for operating a ground milling machine, in particular for the reduction of the dust pollution. This method particularly relates to the operation of a ground milling machine, as shown in FIGS. 1 to 3. Essential steps of the method according to the present invention include performing 42 a milling process. Significant amounts of dust will be generated in this milling process. Thus, according to the present invention, dust-laden air is guided 43 to an electrostatic precipitator 12. This can particularly be effected via a suitable pump device 13, in particular a suction fan, as described above, and corresponding connection lines. Subsequently, the dust particles are charged and precipitated in the electrostatic precipitator 12 in step 44 inside the electrostatic precipitator 12. Charging is effected by passage through a charging stage, and precipitation is effected by precipitation of the electrostatically charged dust particles on the precipitator stage. Finally, the cleaned or purified air is blown out 45 of the electrostatic precipitator 12, for example, to the outer surroundings or, in particular, also into the conveyance channel 18 of the conveyor belt, in particular the loading conveyor belt 11.

The method according to the present invention delivers good results particularly if charging and precipitation of the dust particles in the air is effected in a compartment separate from the conveyance channel of the milled material. In this case, the method according to the present invention also includes a step, in which the dust-laden air is separated from the milled material, for example, suctioned.

Furthermore, the cleaning result of the method according to the present invention can be improved if an additional cleaning stage 46 is connected downstream the precipitation of dust particles using the electrostatic precipitator according to steps 42 to 45, in which additional stage the air passes through a water curtain, in particular of a corresponding sprinkling device, as described above. A major part of very small, electrostatically charged dust particles that have undesirably passed the electrostatic precipitator 12 is collected in this way.

In addition, or as an alternative, it is also possible that a pre-cleaning of the dust-laden air is effected according to step 49 prior to the precipitation steps 42 to 45, for example, by means of a cyclone separator and/or a filter grate and/or a labyrinth filtering stage. As a result, coarse particles can be prevented from being suctioned together with the dust-laden air and from reaching the electrostatic precipitator 12.

Figure 5:
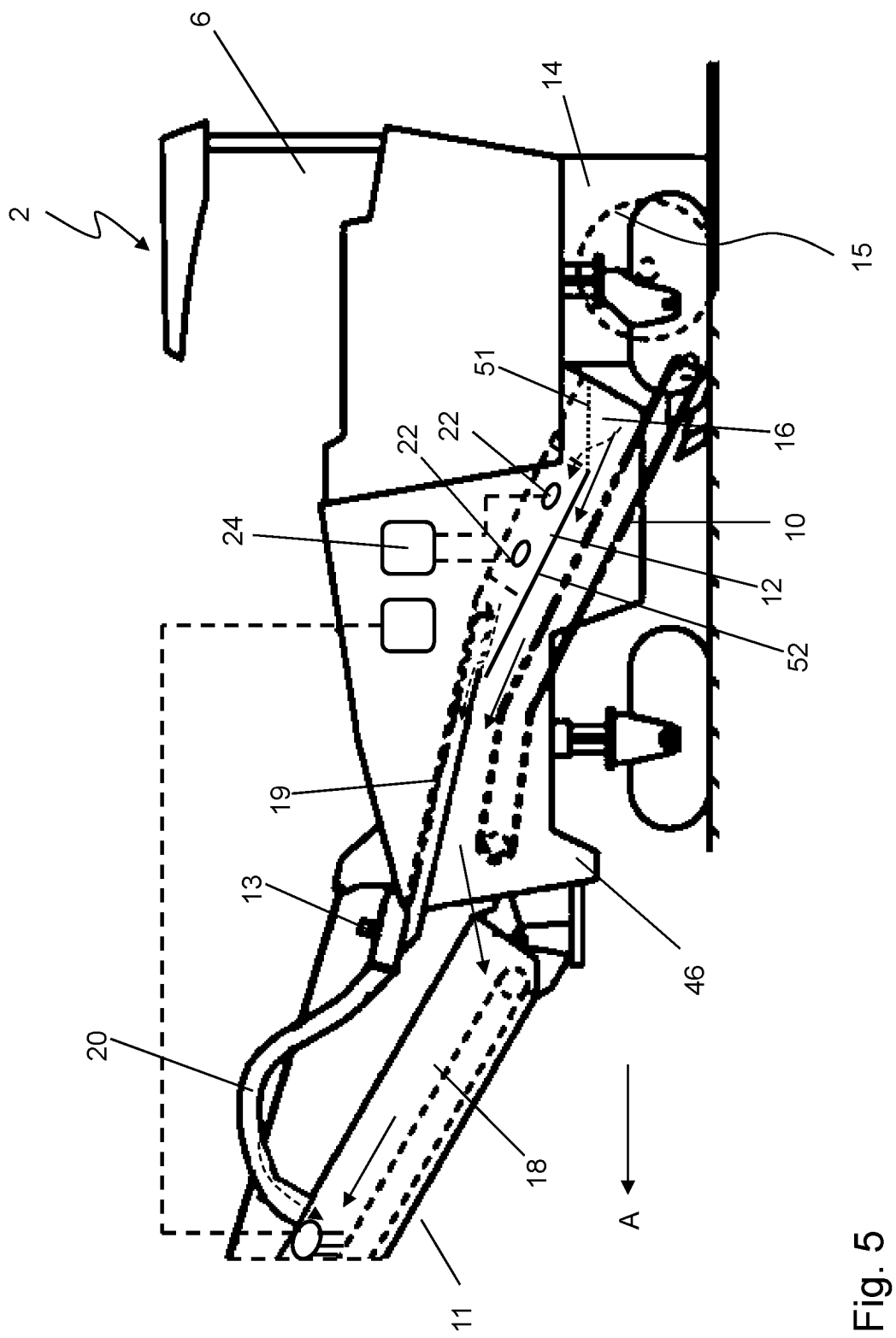
FIG. 5 is a side view of a ground milling machine in a second embodiment.
Figure 6:
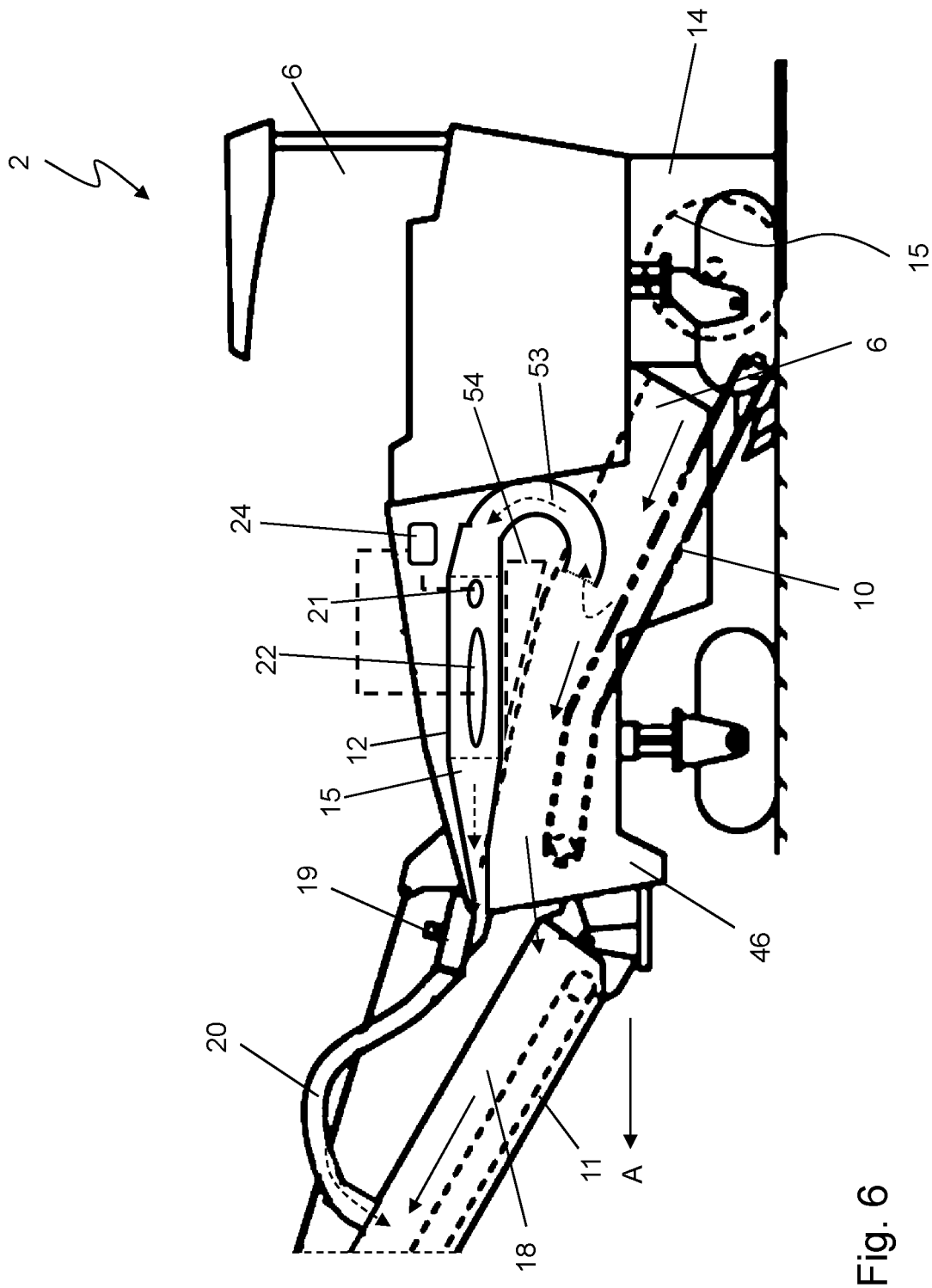
FIG. 6 is a side view of a ground milling machine in a third embodiment.
Figure 7:
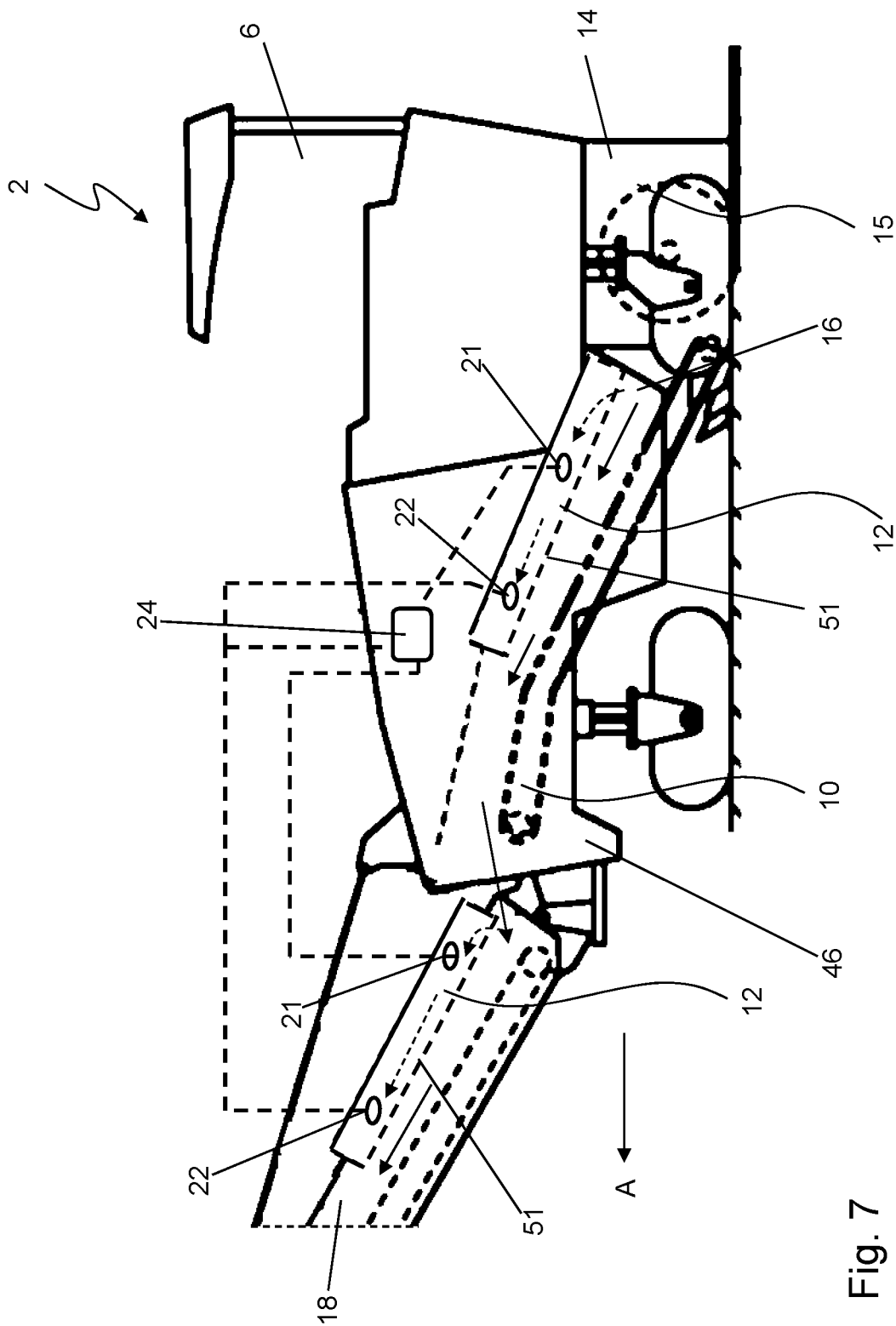
FIG. 7 is a side view of a ground milling machine in a fourth embodiment.

FIGS. 5, 6 and 7 illustrate advantageous modifications of the exemplary embodiment according to FIG. 2, wherein hereinafter essentially the existing differences are emphasized, and reference is made to the related explanations of the first exemplary embodiment for the rest.

A feature in the exemplary embodiment of FIG. 5 is that the electrostatic precipitator 12 is arranged inside the machine 2. Thus, the electrostatic precipitator 12 is surrounded by the body 50 or the body shell of the machine 2 (the loading conveyor belt 11 is not part of the body 50). As a result, a particularly compact machine can be obtained. Furthermore, the electrostatic precipitator is significantly closer to the milling drum box with respect to the conveying path of the milled material. Specifically, it is located above the transfer conveyor belt 10 inside the machine-side conveyance channel 16 and thus essentially in the empty space inside the body 15, in which also the transfer conveyor belt 10 is arranged. In the flow direction of the dust-laden air (dashed arrows B) directly in front of the electrostatic precipitator 12, a protective grate 51 is provided, which prevents that coarse milled material particles are also suctioned into the electrostatic precipitator 12. The protective grate 51 extends in an essentially horizontal plane. Thus, the protective grate 51 is a physical barrier for coarser milled material particles for the protection of the electrostatic precipitator 12. Instead of the protective grate 51, it is also possible to provide a labyrinth stage. Furthermore, the electrostatic precipitator comprises a protective metal sheet on its bottom side facing the transfer conveyor belt 10. This metal sheet is reinforced and protects the electrostatic precipitator 12 located above from damages caused by the milled material. The protective metal sheet 52 extends over the entire length of the electrostatic precipitator 12 in the conveying direction of the milled material. Another essential feature is that the pump device 13 is positioned downstream the electrostatic precipitator 12 in the conveying direction of the dust-laden air in the present exemplary embodiment. As a result, dust pollution of the pump device 13 per se is significantly reduced compared to the preceding exemplary embodiment, so that this pump device is exposed to the dust to a lesser extent.

Another alternative exemplary embodiment is illustrated in FIG. 6. Just as well, the electrostatic precipitator 12 is arranged to be integrated on the machine side in the internal space of the machine 12 surrounded by the body 50. However, the electrostatic precipitator 12 is not located inside the conveyance channel 16, but above the conveyance channel 16 without direct contact to the latter inside the machine. Furthermore, a deflection device 53 is connected upstream the electrostatic precipitator 12, via which the dust-laden air is supplied to the electrostatic precipitator 12. What is essential here is that a deflection of the dust-laden air using the deflection device is effected in the conveying direction of the milled material. Actually, the dust-laden air is suctioned in a direction against the conveying direction of the milled material by the deflection device 53. As a result, the suctioning of larger miller material particles into the deflection device 53 can be counteracted. Here, the deflection angle (angle between the conveying direction of the milled material and the inlet direction of the dust-laden air into the deflection device 53 is ideally larger than 90° and very particularly larger than 120°.

Optionally, a collection container 54 is further provided underneath the electrostatic precipitator 12. This container can be used for cleaning the electrostatic precipitator 12. Knocked-off dust, which has been precipitated on the electrostatic precipitator 12, can fall through a connection opening, which is not further shown, between the electrostatic precipitator 12 and the container 54 into this container. The precipitated dust can then be discharged separately by removing the container 54 from the inner space of the machine. To that end, the container may be either permanently inserted in the machine 1 or be inserted especially during cleaning works on the electrostatic precipitator 12.

Finally, in the exemplary embodiment according to FIG. 7, no pump device 13 is provided compared to the preceding exemplary embodiments. Instead, the electrostatic precipitator 12 is formed to be open with its bottom side toward the conveyance channel 16, and a protective grate 51 is provided at the bottom side of the electrostatic precipitator, which extends over the entire length thereof. Thus, the dust-laden air is not selectively fed to the electrostatic precipitator 12. Nevertheless, this results in a directed air flow of the milled material inside the conveyance channel 16 due to the conveying movement of the milled material, through which finally also at least a part of the dust-laden air is fed to the electrostatic precipitator coming from below. The arrangement shown in FIG. 7 already allows obtaining an effective reduction of the dust content in the air. In order to further improve the precipitation rate, a further electrostatic precipitator arranged on the loading conveyor belt 11 is disposed downstream the electrostatic precipitator 12 inside the machine. This one is also formed to be open at its bottom side toward the milled material located on the loading conveyor belt 12, so that dust-laden is routed past the electrostatic precipitator 12 there as well. By means of the series connection of the two electrostatic precipitators 12, a precipitation rate which is sufficient for many applications can be reached on the whole, without requiring an additional pump device. The cleaning result of the dust-laden air can even further be improved by the sprinkling device creating a water curtain, as described with reference to FIG. 2.

In FIG. 7, both electrostatic precipitator 12 are supplied with electric energy by a common supply device 24. However, a distinct individual supply device 24 may be provided for each of the two electrostatic precipitators 12. Just as well, it is also possible to connect the electrodes of the electrostatic precipitators via a common supply line to the supply device 24 (which is the case for electrodes 22 in FIG. 7) or to provide individual supply lines in each case (which is the case for the electrodes 21 in FIG. 7). The latter provides the advantage that an individual control of the two electrostatic precipitators 12 is simplified, whereas the first variant requires less installation work. Usually, the electrodes of the two electrostatic precipitators 12 in FIG. 7 are all individually connected to the supply device 24, or are commonly connected in pairs to the supply device.

The present invention has been illustrated by description of various embodiments and while those embodiments have been described in considerable detail, it is not the intention of applicants to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of applicants' invention.

What is claimed is:

1. A ground milling machine for removing ground material, comprising:
   a machine frame having a chassis;
   a milling drum supported on the machine frame;
   a transport device having at least one conveyor belt which is configured for transporting milled material in a conveying direction away from the milling drum to a discharge point; and
   a water sprinkling device,
   wherein the ground milling machine comprises an electrostatic precipitator via which dust-laden air generated during a milling operation and/or during the transport of milled material can be precipitated, and
   wherein the water sprinkling device is provided, with respect to a flow direction of the air, in an area downstream of the electrostatic precipitator.

2. The ground milling machine according to claim 1, wherein the electrostatic precipitator is arranged at the transport device.

3. The ground milling machine according to claim 2, wherein the electrostatic precipitator is arranged at a suspension conveyor belt.

4. The ground milling machine according to claim 1, wherein the transport device comprises a transfer conveyor belt and, downstream thereof in the conveying direction, a loading conveyor belt, and in that the loading conveyor belt comprises a machine part and a foldable part, the foldable part being foldable to the machine part, and the electrostatic precipitator being arranged at the machine part.

5. The ground milling machine according to claim 4, wherein the water sprinkling device is provided, with respect to the flow direction of the air, in the loading conveyor belt.

6. The ground milling machine according to claim 1, wherein the ground milling machine comprises a machine body, the electrostatic precipitator being arranged inside the machine body.

7. The ground milling machine according to claim 1, wherein the ground milling machine comprises at least one transfer conveyor belt onto which milled material conveyed out of a milling drum box is directly transferred and via which the milled material is transported out of an interior of the machine, a duct being provided for receiving the transfer conveyor belt, and the electrostatic precipitator being at least partially arranged inside this duct.

8. The ground milling machine according to claim 1, wherein the ground milling machine comprises a pump device via which the dust-laden air can be conveyed, the pump device being configured such that it feeds the dust-laden air to the electrostatic precipitator.

9. The ground milling machine according to claim 8,
wherein the pump device comprises a suction device via which the dust-laden air is suctioned from the milled material and the direct vicinity thereof, the suction device being configured such that a suction direction toward the suction device at least partially runs against the conveying direction of the milled material.

10. The ground milling machine according to claim 8,
wherein a flow duct is provided through which the dust-laden air is routed using the pump device, comprising at least one of the following features:
the electrostatic precipitator is at least partially provided with at least one charging stage and at least one precipitation stage, arranged within the flow duct, and/or
the flow duct is at least partially spatially separated from a conveyance channel at least partially surrounding the conveyor belt, and/or
the flow duct is at least partially integrated in a conveyance channel surrounding the conveyor belt, and/or
an outlet side of the flow duct ends into a conveyance channel above the conveyor belt, and/or
the flow duct is followed by a connection line, through which the air exiting the flow duct is routed to a conveyance channel and/or to external surroundings, and/or
the flow duct is arranged on a conveyance channel or inside a machine body.

11. The ground milling machine according to claim 10,
wherein the charging stage is an anode and the precipitation stage is a cathode.

12. The ground milling machine according to claim 10,
wherein the precipitation stage comprises at least one of the following features:
the precipitation stage is a housing of the electrostatic precipitator, which is formed as a flow duct;
the precipitation stage comprises precipitation elements, which extend longitudinally in a main flow direction;
the precipitation stage comprises a precipitation element running at least partially at an angle to a main flow direction;
the precipitation stage comprises a precipitation element in the form of a plate or grate;
and/or the charging stage comprises at least one of the following features:
the charging stage it is a wire, a meshed wire or a plate-like structure;
the charging stage extends in a longitudinal direction of the precipitation stage, in particular along the flow duct;
the charging stage extends in a flow direction of the dust-laden air;
the charging stage comprises at least one sub-region extending essentially transversely to a flow direction of the dust-laden air.

13. The ground milling machine according to claim 8,
wherein the pump comprises a suction device.

14. The ground milling machine according to claim 1,
wherein a cleaning device is provided via which material adhering to the electrostatic precipitator can be removed therefrom, the cleaning device comprising a discharge opening or discharge flap through which material cleaned off by the precipitator stage can be removed from the electrostatic precipitator onto the conveyor belt, the discharge opening or flap being configured such that it creates a vertical and/or direct, passage connection between the electrostatic precipitator and a free space located directly above the conveyor belt.

15. The ground milling machine according to claim 1,
wherein at least one maintenance flap is provided in a housing of the electrostatic precipitator, through which access to an internal space of the electrostatic precipitator is provided.

16. The ground milling machine according to claim 15,
wherein the ground milling machine comprises at least one of the following features:
the electrostatic precipitator comprises a closing state sensor, via which the closing state of the maintenance flap can be monitored;
the electrostatic precipitator is connected to the power grid of the ground milling machine for being supplied with electric energy, in particular using an interconnected converter;
a pre-filtering stage for precipitation of coarse particles is provided, which is connected upstream the electrostatic precipitator in the flow direction, wherein the pre-filtering stage particularly is a cyclone separator and/or a grate and/or a labyrinth filter stage;
a post-filtering stage for precipitation of particulate matter is provided, which is connected downstream the electrostatic precipitator in the flow direction, the post-filter stage being another electric filter.

17. The ground milling machine according to claim 1,
wherein the electrostatic precipitator comprises at least one of the following features:
the electrostatic precipitator is formed as a module, including at least one connection device for connecting an electric energy supply device;
the electrostatic precipitator includes a detachable holding device for fastening to the ground milling machine.

18. A method for operating a ground milling machine according to claim 1, comprising the steps:
a) performing a milling process;
b) routing of dust-laden air to the electrostatic precipitator;
c) charging and precipitating of dust particles in the electrostatic precipitator;
d) passing the air through the water sprinkling device downstream of the charging and precipitation of dust particles in the electrostatic precipitator in the air flow direction to clean the air; and
e) blowing out cleaned air.

19. The method according to claim 18,
wherein the method comprises at least one of the following method steps:
in step b), sucking the dust-laden air out of the milling drum box and/or a conveyance channel for milled material is effected, and/or
in step c), the charging and precipitation is performed in a flow duct of the electrostatic precipitator running separately from a conveyance channel, and/or
a precipitation of coarse particles with a pre-filter stage is effected upstream the charging and precipitation of dust particles in the electrostatic precipitator in the air flow direction.

* * * * *